US008438235B2

(12) United States Patent
Shaffer et al.

(10) Patent No.: US 8,438,235 B2
(45) Date of Patent: May 7, 2013

(54) TECHNIQUES FOR INTEGRATING INSTANT MESSAGING WITH TELEPHONIC COMMUNICATION

(75) Inventors: Daniel Shaffer, Palo Alto, CA (US);
Labhesh Patel, San Francisco, CA (US);
Shmuel Shaffer, Palo Alto, CA (US);
Cullen F. Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1189 days.

(21) Appl. No.: 11/213,505

(22) Filed: Aug. 25, 2005

(65) Prior Publication Data
US 2007/0050463 A1  Mar. 1, 2007

(51) Int. Cl.
*G06F 15/16* (2006.01)
(52) U.S. Cl.
USPC .......................................... 709/207; 709/206
(58) Field of Classification Search ........... 709/206–207
See application file for complete search history.

(56) References Cited

U.S. PATENT DOCUMENTS

| 6,694,351 | B1 | 2/2004 | Shaffer et al. ................. 709/204 |
| 6,714,793 | B1 * | 3/2004 | Carey et al. .................... 455/466 |
| 6,807,565 | B1 | 10/2004 | Dodrill et al. .................. 709/206 |
| 7,085,258 | B2 * | 8/2006 | Creamer et al. ............... 370/352 |
| 7,269,627 | B2 * | 9/2007 | Knauerhase ................... 709/206 |
| 7,274,909 | B2 | 9/2007 | Pertilla et al. |
| 7,519,912 | B2 * | 4/2009 | Moody et al. .................. 715/753 |
| 8,260,266 | B1 * | 9/2012 | Amidon et al. ............ 455/414.1 |
| 2002/0161862 | A1 * | 10/2002 | Horvitz .......................... 709/220 |
| 2003/0016657 | A1 * | 1/2003 | Creamer et al. ............... 370/352 |
| 2003/0023691 | A1 * | 1/2003 | Knauerhase ................... 709/206 |
| 2003/0087632 | A1 * | 5/2003 | Sagi et al. ...................... 455/414 |
| 2003/0154293 | A1 * | 8/2003 | Zmolek .......................... 709/228 |
| 2003/0220835 | A1 | 11/2003 | Barnes |
| 2004/0015569 | A1 * | 1/2004 | Lonnfors et al. ............... 709/220 |
| 2004/0088540 | A1 * | 5/2004 | Marturano et al. ........... 713/156 |
| 2004/0125756 | A1 * | 7/2004 | Lepore et al. .................. 370/261 |
| 2004/0203350 | A1 * | 10/2004 | Shultz et al. .................. 455/41.1 |
| 2004/0205775 | A1 * | 10/2004 | Heikes et al. .................. 719/318 |
| 2004/0218749 | A1 | 11/2004 | Shaffer et al. ............ 379/265.02 |
| 2004/0225679 | A1 | 11/2004 | Oran .......................... 707/104.1 |

(Continued)

OTHER PUBLICATIONS

U.S. Office Action dated Dec. 29, 2008 issued in U.S. Appl. No. 11/191,519.

(Continued)

*Primary Examiner* — Krista Zele
*Assistant Examiner* — Tariq Najee-Ullah
(74) *Attorney, Agent, or Firm* — Weaver Austin Villeneuve & Sampson LLP

(57) ABSTRACT

Disclosed are apparatus and techniques for escalating an instant messaging (IM) session between two or more users to an audio session so that a communication device (by one or more users) that will optimize the audio session is selectively and intelligently utilized. In one embodiment, if an IP (Internet Protocol) phone is connected to the computer on which an IM session is being escalated, the IP telephone may be used instead of the computer device's own soft telephone so as to maximize audio clarity and quality. In another embodiment, a user's cell phone may be utilized for a mobile user who is using a laptop that is not coupled to an IP telephone or who is communicating from a hotel room in which a telephone call is typically more expensive than a cell phone call. Numerous embodiments for optimizing such audio sessions are described herein.

29 Claims, 4 Drawing Sheets

U.S. PATENT DOCUMENTS

| | | | | |
|---|---|---|---|---|
| 2005/0038876 | A1* | 2/2005 | Chaudhuri | 709/219 |
| 2005/0041603 | A1 | 2/2005 | Tighe et al. | 370/260 |
| 2005/0069104 | A1* | 3/2005 | Hanson et al. | 379/88.19 |
| 2005/0084086 | A1 | 4/2005 | Hesse | |
| 2005/0125498 | A1* | 6/2005 | Frank et al. | 709/206 |
| 2005/0125541 | A1* | 6/2005 | Frank et al. | 709/227 |
| 2005/0141691 | A1* | 6/2005 | Wengrovitz | 379/211.02 |
| 2005/0141694 | A1* | 6/2005 | Wengrovitz | 379/265.09 |
| 2005/0165584 | A1* | 7/2005 | Boody et al. | 702/186 |
| 2005/0204310 | A1* | 9/2005 | De Zwart et al. | 715/821 |
| 2005/0233749 | A1 | 10/2005 | Karaoguz et al. | |
| 2005/0249196 | A1* | 11/2005 | Ansari et al. | 370/352 |
| 2005/0278646 | A1* | 12/2005 | Liscano et al. | 715/762 |
| 2006/0031339 | A1* | 2/2006 | Peters | 709/206 |
| 2006/0041581 | A1* | 2/2006 | Aghvami et al. | 707/102 |
| 2006/0104260 | A1* | 5/2006 | Croak et al. | 370/352 |
| 2007/0041366 | A1* | 2/2007 | Vugenfirer et al. | 370/352 |
| 2007/0220092 | A1* | 9/2007 | Heitzeberg et al. | 709/204 |
| 2007/0299927 | A1* | 12/2007 | Knauerhase | 709/206 |
| 2009/0222858 | A1* | 9/2009 | Hjelm et al. | 725/47 |

OTHER PUBLICATIONS

U.S. Final Office Action dated Jul. 7, 2009 issued in U.S. Appl. No. 11/191,519.

U.S. Office Action dated Dec. 29, 2009 issued in U.S. Appl. No. 11/191,519.

U.S. Final Office Action dated Jul. 21, 2010 issued in U.S. Appl. No. 11/191,519.

Melnikov, Henry, "Open Solutions for Location Based Services in WLAN Environment" Apr. 6, 2003, Tampere University of Technology-Department of Information Technology.

J. Cuellar et al., "Geopriv Requirements" Feb. 2004, RFC 3693. © The Internet Society 2004.

J. Winterbottom et al., "GEOPRIV PIDF-LO Usage Clarification, Considerations and Recommendations" draft-ietf-geopriv-pdif-lo-profile-01.txt, Jul. 18, 2005, Internet-Draft. © the Internet Society 2005.

Ibach, Peter et al., "Dynamic Value Webs in Mobile Environments Using Adaptive Location-Based Services", Proceedings of the 38th Hawaii International Conference on System Sciences-2005. © 2005 IEEE.

M. Day et al., "A Model for Presence and Instant Messaging", Feb. 2000, RFC 2778. © The Internet Society 2000.

PanGo Networks, Inc.-Press Release, "PanGo First to Integrate Wi-Fi based Active RFID Product with Cisco's New Wireless Location Appliance" printed Jul. 26, 2005. http://www.pangonetworks.com/release_34.htm.

* cited by examiner

TECHNIQUES FOR INTEGRATING INSTANT MESSAGING WITH TELEPHONIC COMMUNICATION

BACKGROUND OF THE INVENTION

The present invention relates to the general technology area of instant messaging. More specifically, it relates to optimizing telephonic communication in an instant messaging scenario.

Instant Messaging (IM) is widely used to communicate between two or more users since IM allows a user to be immediately notified of a message from another party. As shown in FIG. 1, a first user may activate an IM client 106 on his computer device 104 to send instant messages to a second user's IM client 110 on her computer device 108 via local area network (LAN) 102 or any other suitable wide area network (WAN).

As the exchange between two users, for example, becomes more involved, a user may elect to move to a live discussion which lends itself better to information exchange. The AOL (America Online), MSN Messenger, and Yahoo IM clients each offer a means for escalating an IM session to a multimedia session with voice using an IM embedded voice client on each user's computer. For example, each user's computer may be equipped with a microphone (e.g., 114 and 118) and a speaker (e.g., 112 and 116) for conducting an audio enabled session.

Unfortunately, the voice quality of an IM embedded voice client is typically poor. For instance, an IM embedded voice client may output sound having a lot of static and echo. Additionally, when a computer's speakers and microphone are used to communicate, the user does not have much privacy from unintended listeners. The available bandwidth may also not allow one to communicate clearly. For instance, a 33 kbps bandwidth is large enough for an IM session, but this same 33 kbps bandwidth is not large enough to accommodate audio communication.

What is needed is a technique for intelligently escalating the IM session to a telephonic device, such as an IP telephone, that is associated with the IM user and has better voice quality or some other optimum quality.

SUMMARY OF THE INVENTION

Accordingly, the present invention provides apparatus and techniques for escalating an instant messaging (IM) session between two or more users to an audio session so that a communication device (by one or more users) that will optimize the audio session is selectively and intelligently utilized. In one embodiment, if an IP (Internet Protocol) phone is connected to the computer on which an IM session is being escalated, the IP telephone may be used instead of the computer device's own soft telephone so as to maximize audio clarity and quality. In another embodiment, a user's cell phone may be utilized for a mobile user who is using a laptop that is not coupled to an IP telephone or who is communicating from a hotel room in which a telephone call is typically more expensive than a cell phone call. Numerous embodiments for optimizing such audio sessions are described herein.

In one embodiment, a method for escalating an instant message (IM) session between a plurality of participants to an audio or audiovisual session between the plurality of participants is disclosed. After an IM session is in progress between two or more participants, it is then determined what communication devices are available for each participant. After determining what communication devices are available for each participant, an optimum communication device is then selected for each participant from the one or more communication devices that were determined to be available for the each participant. After a request for an audio session is received from a selected one of the participants, an audio session is started between the participants using the selected optimum communication device for each participant.

In a specific implementation selecting an optimized communication device includes considering one or more of the following factors: audio quality of each communication device, proximity of each of the communication device to a one of the participants, bandwidth size that is available for the audio session, and associated toll of using each available communication device. In one aspect, determining which communication devices are available for each participant is accomplished by obtaining a communication profile for each participant that specifies one or more phone numbers of their available communication devices and an indication of priority for using such available communication devices. In a further aspect, a first computer device that is being used by the selected participant for the IM session is configured with the selected participant's communication profile and also receives a communication profile from the other participants via their remote computer devices so that the communication profile of the selected participant is obtained from the first computer device and the communication profile of the other participants are obtained by being received into the first computer device from their remote computer devices.

In yet another embodiment, the communication profile of each participant is created or modified by each participant. In another implementation, the communication profile of each participant is stored on a remote server and each communication profile of each participant is obtained from the remote server. In another aspect, on a first computer device that is being used by the selected participant, the step of obtaining the communication profile of the selected participant includes discovering whether one or more communication devices are proximate to the selected user's computer device. In a further aspect, the step of discovering includes obtaining an association between the first computer device and an IP (Internet Protocol) telephone that is coupled to the first computer device. In another aspect, the discovering includes exchanging wireless information between the first computer device and one or more communication devices that are proximate to the first computer (when present), and the wireless information from each discovered communication device is formed into a communication profile for such discovered communication device. In particular embodiments, exchanging wireless information is accomplished using a Bluetooth protocol, radio frequency (RF) signals, and/or infrared (IR) signals. In one aspect, the step of discovering includes determining that one or more communication devices share a same wireless access point as the first computer device.

In one example, starting an audio session between the participants is accomplished by a call manager that initiates the audio session between the selected optimum communication devices of the participants. In another aspect, the steps of determining what communication devices are available for each participant and selecting an optimum communication device are only performed after a request for an audio session is received from a selected one of the participants.

In an alternative embodiment the invention pertains to a computer system for escalating an instant message (IM) session between a plurality of participants to an audio or audiovisual session between the plurality of participants. The system includes one or more processors and one or more memory. The one or more processors and memory are configured to perform one or more of the steps described above.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
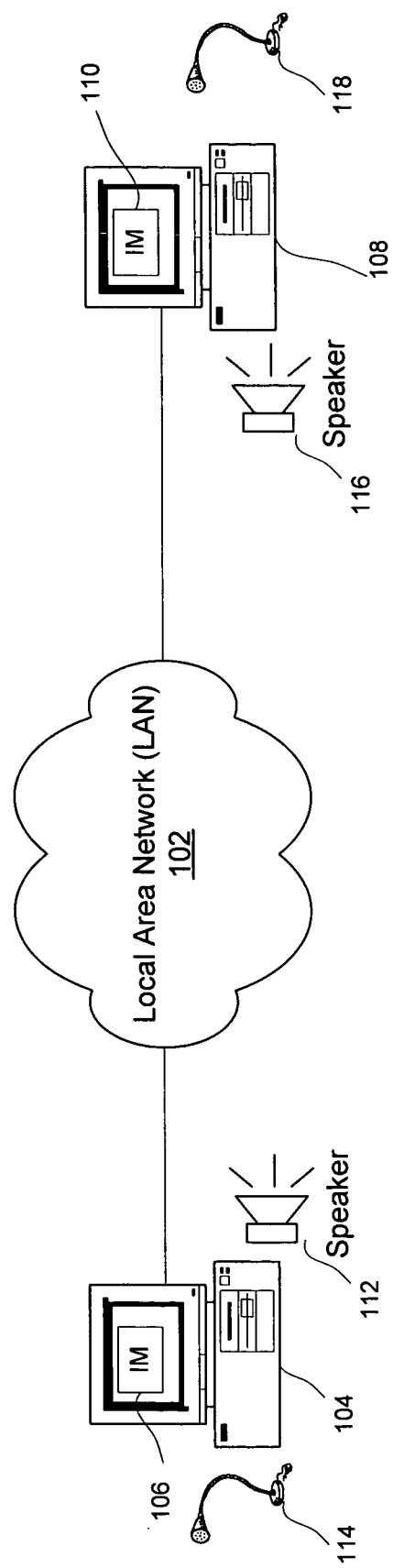
FIG. 1 is diagrammatic representation of a conventional instant messaging (IM) arrangement.
Figure 2:
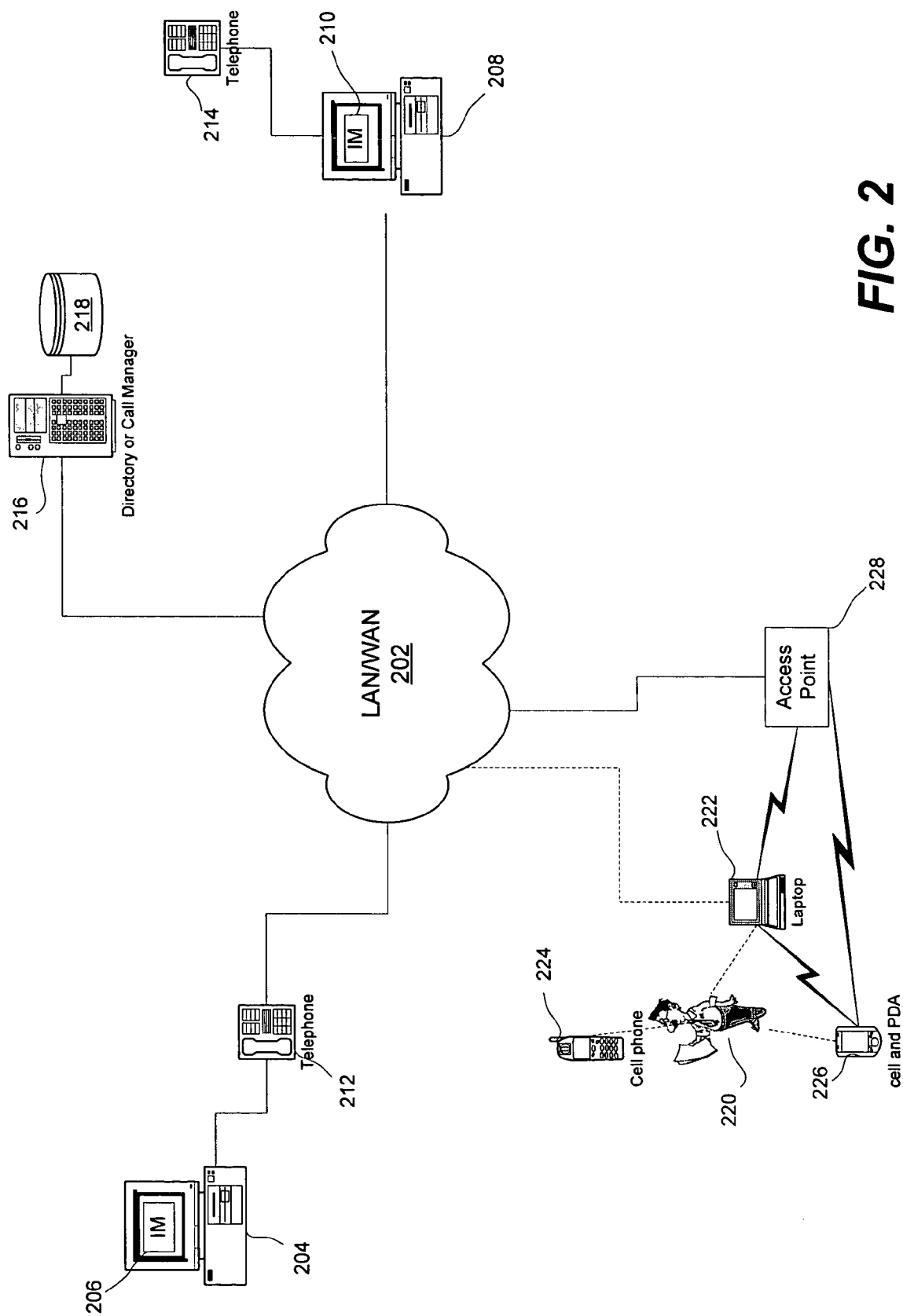
FIG. 2 is a diagrammatic representation of an example network segment in which embodiments of the present invention may be implemented.

FIG. 2 is a diagrammatic representation of an example network segment in which embodiments of the present invention may be implemented. This diagram will be used to illustrate different novel embodiments for escalating an IM (instant messaging) session to an audio session so that one or more optimal communication devices are selectively used in the audio session. In general, embodiments of the present invention include techniques for determining which communication devices are available for one or more of the users in an IM session. The communication devices that are found to be available for each user are then assessed, along with other relevant audio factors, to then select an optimum communication device for each user to use in an audio session.

An optimization procedure for selecting a communication device may include consideration of one or more factors. By way of examples, the selection factors may include a communication device's clarity and/or proximity to user, the bandwidth size available for the communication device, the expense of (or toll associated with) using such communication device, etc. The clarity of a particular device depends on the device's DSP and power DSP algorithms that the device has. For example, some devices may have packet loss concealment (PLC) algorithms, while other devices may have eco cancellation algorithms, and yet others may have both algorithms implemented, etc. Although the invention is described herein in relation to an audio session only, the techniques of the present invention may be also implemented for an audiovisual session to intelligently select an optimum audiovisual device, such as a video telephone or video cell phone.

A user may use any suitable IM client on any type of computer device to invoke an IM session with another user. As shown, a user may activate IM client 206 on a desktop computer device 204 to communicate with another user via IM client 210 on desktop computer device 208. A computer device, such as a stationary desktop device, may be coupled with an IP telephone. In FIG. 2, computer 204 is coupled with IP telephone 212, for example, via an Ethernet switch that is located inside the IP phone and the telephone is also coupled to a local area network (LAN) and/or wide area network (WAN) 202 (e.g., via the same Ethernet switch), while computer 208 is coupled to the LAN/WAN 202 and also to IP telephone 214. The IP telephones may be coupled to the computers via any suitable connection mechanisms like Ethernet switch or a router. For example, a Cisco Telecaster available from Cisco Systems, Inc. of San Jose, Calif. includes a three way switch that is coupled to the Telecaster itself, a LAN/WAN via a router/switch, and a computer device (as shown for computer 204 and IP telephone 212). Of course, the computer may be coupled instead to both the LAN/WAN via a router/switch and the IP telephone (as shown for computer 208 and IP telephone 214). In another example, a computer and IP telephone may be individually coupled to the WAN/LAN, for example, via a router/switch (not shown).

A user may also have access to other communication devices. For instance, the user may have various communication devices on his person or proximate to his position. Referring to FIG. 2, user 220 has a cell phone 224, a combination cell phone and PDA (personal digital assistant) 226, and laptop 222 in his possession.

Embodiments of the present invention include techniques for selecting an optimum one or more communication devices for use in escalating an IM session to an audio session. These techniques are implemented in conjunction with execution of an IM client, such as an AOL (America Online), MSN (Microsoft), or Yahoo IM client. In one implementation, the techniques are implemented as an audio escalation plug-in for the particular IM client. Alternatively, the IM client software is modified to implement the escalation techniques of the present invention.

Figure 3:
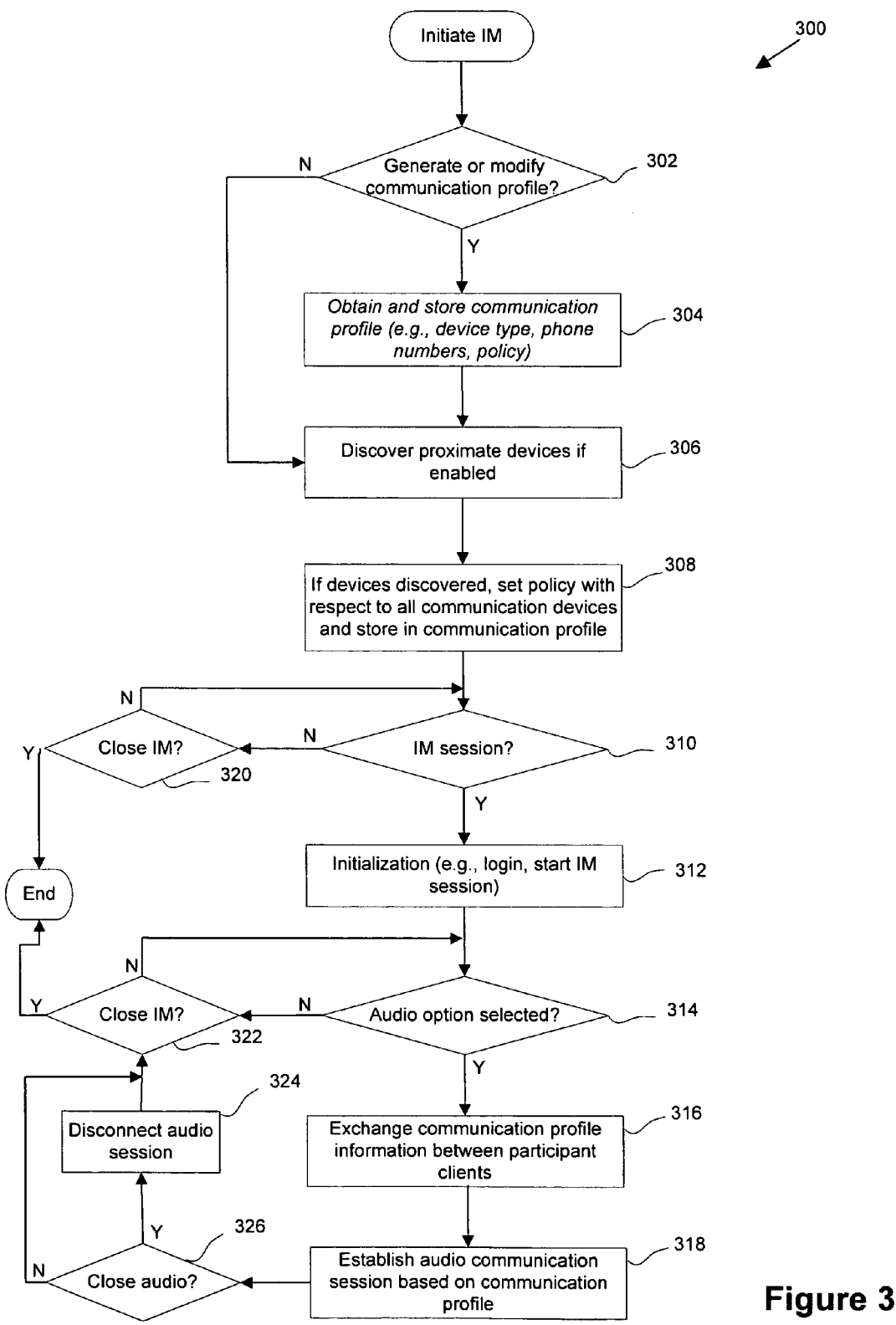
FIG. 3 is a flow chart illustrating a procedure for intelligently escalating an IM session to an audio session selectively utilizing one or more optimum communication devices in accordance with one embodiment of the present invention.

FIG. 3 is a flow chart illustrating a procedure for escalating an IM session to an audio session by selectively utilizing one or more optimum communication devices in accordance with one embodiment of the present invention. This flow may be implemented with respect to a particular participant's computer device on which an IM client is being initiated. A similar process may also be implemented on the other participant's computer device. That is, the description below refers to a process for a single participant, but it may also be applied in parallel to other participants.

After initiation of an IM session by a particular user, it is determined whether a communication profile is being generated or modified, for example, by the particular user initiating the IM session in operation 302. If a profile is being (or has been) created or modified, the profile is obtained and stored in operation 304. If a profile is not being generated or modified, operation 304 is skipped.

A communication profile may include any suitable information for choosing and using communication devices that are available to the user. By way of examples, the profile may include a list of phone numbers and corresponding communication devices that are available to the particular user and may also indicate a priority for using such phone numbers during an IM session. The particular user may setup and then modify his profile at any suitable time after the IM client is opened. The communication profile may alternatively be preconfigured by an administrator.

In one implementation, when the IM client is activated, the user may select a profile option to modify or generate a profile. After the profile option is selected, the user may be presented with a list of fields into which he may enter phone numbers, types of devices, and/or priority indications. The priority indications may be implemented in any suitable manner, such as numbering the phone numbers in order of priority. Alternatively, the phone number entries can be presented as movable GUI (graphical user interface) objects that are movable for placement in a ordered list. In another implementation, the user may create or modify a profile in a separate process from the IM client. Upon activation, the profile is automatically obtained in this later example. The profile may be stored locally on the same computer as the IM client (e.g., computer 204, 208, or 222) or on a remote directory server (e.g., server 216). Referring to FIG. 2, user 220 may form a profile that lists in order of priority phone numbers for his cell phone 224, cell/PDA 226, and office IP telephone (not shown) and this profile is stored on his laptop 222 or database 218 of directory server 216.

Communication devices that are proximate to the user (or his/her computer device in which the IM client resides) may then be discovered (if discovery is enabled) in operation 306. A discovery procedure may occur in addition or as an alternative to a user generating or modifying a communication profile. A discovery procedure may include any suitable techniques for automatically locating communication devices that are proximate to the particular user (or computer device) who is initiating the IM client. In a simple technique, the computer device on which the IM client resides may be associated with a particular IP telephone and this association is configured on the computer device or stored remotely. For example, the association between computer 204 and IP telephone 212 may be preconfigured on computer 204 or stored in database 218 of directory server 216. For instance, the MAC address and/or IP address of the computer and IP telephone may be stored as a single database entry on the computer or a remote directory server 216.

In another implementation, a wireless communication session is implemented to search for communication devices that are proximate to the computer device on which the IM client is initiated. In another implementation, the computer device and proximate communication devices may have wirelessly contacted and discovered each other prior to activation of the IM client.

Discovery may utilize any suitable wireless communication mechanism and/or application. Examples include a Bluetooth or IR (infrared) protocol, Jini Network Technology (available from Sun Microsystems, Inc., of Santa Clara, Calif.), Zeroconf (zero configuration networking), an 802.11 wireless protocol, etc.

Generally, communication profile information for communication devices that are proximate to the user may be obtained via wireless communication. For example, a computer device on which the IM client is initiated may wirelessly communicate with proximate devices to obtain communication profile information, such as telephone number and device type. As shown in FIG. 2, cell/PDA device 226 communicates with laptop 222 on which an IM client is initiated. Alternatively, communication devices that are utilizing the same wireless access point as the computer device of the IM client may be discovered. For instance, both cell/PDA 226 and laptop 222 may utilize the same wireless access point 228. The access point allows the laptop and cell/PDA 226 to be coupled to the LAN/WAN 202. Alternatively, if one is using their cell phone as a modem for a laptop, for example, via the Bluetooth connection, the laptop then has knowledge regarding the cell phone, such as its phone number and association with the laptop.

In another example, a user may plug their laptop into a third party LAN. When the laptop attempts to access a web page, the request is intercepted by a local server which presents an accounting page to the user for entering billing information. The hotel room and phone number are also stored locally on the laptop, for example, in a file or cookie, which are accessible by the IM client (or escalation module).

Communication profile information may be stored locally for any of the above described proximate devices in any suitable manner. For instance, a computer device that is configured with a Bluetooth or IR application may stored the telephone number and device type of discovered devices in a file or cookie residing on the computer device or a remote server.

If devices are discovered, policy may then be set with respect to the discovered devices, as well as any other associated communication devices in operation 308. For instance, a profile created by a user may be combined with profiles for the discovered devices. The policy may be preconfigured by a user or fixed and not modifiable by the user. In one implementation, the user may be presented with a list of available communication devices and asked to prioritize them or merely select a device to use to thereby form a simple policy.

Policy may include any suitable rules for selecting an optimum communication device from the communication devices associated with the computer device that is being used for initiating an IM client. For example, a rule may be that a cell phone is used when the computer device is a laptop that is plugged into a hotel's local network. Another rules may dictate that an IP phone that is coupled to an initiating desktop computer is used first if present; an IP phone that is within 5 feet of the computer device is used second if a coupled IP phone is not available; a landline is used if an IP phone is not available; and a cell phone is used if no IP or landline phone is available. Another rule may dictate that the closest communication device is to be utilized. For example, the protocol 802.11 may be utilized to access the power level of communication devices to assess the device that is closes to a particular access point. The policy may also consider available bandwidth size and utilize certain devices, such as cell or land phones, under low bandwidth conditions.

In an alternative implementation, policy is not generated for the various communication devices available for each user. In this scenario, a user may simply be presented with the various communication devices options and select one for their use in an upcoming audio session.

Referring back to the illustrated example, it may then be determined whether an IM session has been initiated, for example, by the particular user who initiated the IM client in operation 310. If an IM session is initiated, initialization procedures may be executed in operation 312, such as the user logging into the IM server, authentication, and starting the IM session with the particular user. Of course, the user may have logged into the IM server prior to forming a communication profile and then initiated an IM session after the communication profile was created or modified. The order of the steps of FIG. 3 are not meant to limit the scope of the invention and may be executed in any suitable order, sequentially or in parallel.

It is then determined whether an audio option has been selected, for example, by the particular user in operation 314. For instance, when an IM session is in progress between two participants, one participant may press a "talk" button on the GUI interface for the IM. If such an audio option is selected, communication profile information may then be exchanged between the participant IM clients (or audio escalation plug-in) in operation 316. For example, phone number and priority information may be exchanged.

Audio communication is then established based on the exchanged communication profile in operation 318. That is, the highest priority communication device for each participant is utilized for the audio session. The audio session may be initiated by a third party call control mechanism, wherein a call manager server (e.g., call manager 216) is used to activate a call between the two or more selected communication devices of the two or more participants.

The audio session, IM session, and IM client may be closed in any suitable manner. For example, a user may hit a logout button or hang up and these events trigger a shutdown procedure. As shown, it may be determined whether the audio session has been closed in operation 326. For instance, the IM client (or escalation plug-in) may periodically detect whether the user has selected to logout of the IM or audio session. If the audio session has been closed, the audio session is disconnected, for example, by the call manager in operation 324. If not, this operation is skipped. It may also be determined whether the IM client is closed or exited, for example, when the user is logging out of or shutting down the IM client in operations 320 or 322. If the IM client is closed, the procedure ends. This step may be automatically performed upon a user closing or exiting the IM client. If the IM client is not closed, the procedure waits for an IM or audio session to begin in operations 310 and 314, respectively.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 4:
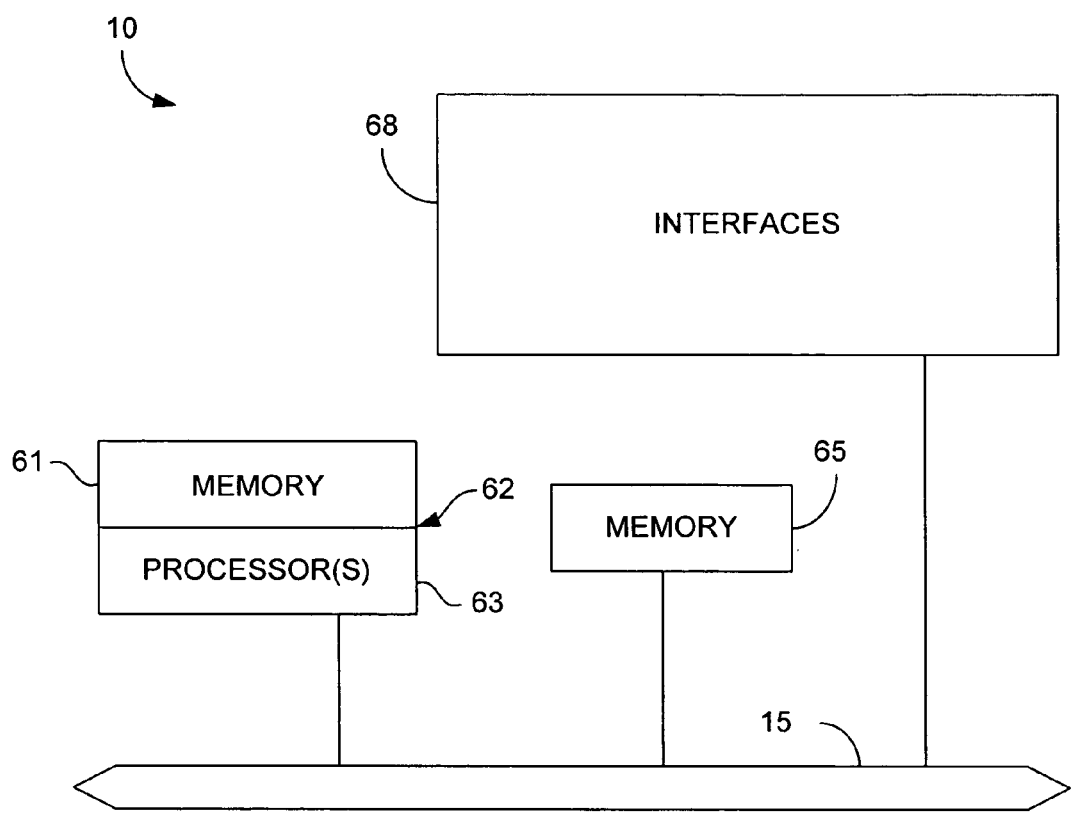
FIG. 4 is a diagrammatic representation of a computer system in which some of the techniques of the present invention may be implemented.

Referring now to FIG. 4, a computer system 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such computer system tasks as computations and application management. It preferably accomplishes all these functions under the control of software including an operating system and any appropriate applications software. CPU 62 may include one or more processors 63 such as a processor from the Motorola family of microprocessors, Intel family of microprocessor, or the MIPS family of microprocessors. In an alternative embodiment, processor 63 is specially designed hardware for controlling the operations of computer system 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the computer system 10. Among the interfaces that may be provided are Ethernet interfaces, frame relay interfaces, cable interfaces, DSL interfaces, token ring interfaces, Bluetooth, wireless, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media.

Although the system shown in FIG. 4 is one specific computer system of the present invention, it is by no means the only computer system architecture on which the present invention can be implemented. Regardless of a computer system's configuration, it may employ one or more memories or memory modules (such as, for example, memory block 65) configured to store data, program instructions for the general-purpose processing operations and/or the inventive techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The computer readable media may take the form of a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for escalating an instant message (IM) session to an audio or audiovisual session, comprising:
   (a) automatically discovering for a first participant of an IM session on a first communication device what other communication devices are proximate to such first communication device, wherein the one or more proximate other communication devices differ from the first communication device of the first participant, wherein the first communication device and other communication devices pertain to different physical devices;

(b) from the one or more proximate other communication devices that were automatically discovered to be proximate to the first communication device, selecting an optimum communication device for use by the first participant in an audio or audiovisual session; and (c) in response to a request for escalating the IM session to an audio or audiovisual session being received from a selected one of the participants of the IM session, escalating from the first communication device being used for the IM session by the first participant to the selected optimum communication device being used for the audio or audiovisual session by the first participant.

2. A method as recited in claim 1, wherein selecting an optimized communication device for the first participant includes considering audio quality of each proximate other communication device for the first participant, proximity of each proximate other communication device to the first participant, bandwidth size that is available for the audio or audiovisual session, and/or associated toll of using each proximate other communication device for each participant.

3. A method as recited in claim 1, wherein automatically discovering what other communication devices are proximate to the first communication device includes obtaining a communication profile for the first participant that specifies a plurality of different phone numbers of the first participant's different communication devices and an indication of priority for using such different communication devices for the first participant.

4. A method as recited in claim 3, wherein the first communication device that is being used by the first participant for the IM session is configured with the first participant's communication profile and also receives a communication profile from the other participants via their remote computer devices so that the communication profile of the first participant is obtained from the first communication device and the communication profile of the other participants are obtained by being received into the first communication device from their remote computer devices.

5. A method as recited in claim 3, wherein the communication profile of the first participant is created or modified by such first participant.

6. A method as recited in claim 3, wherein the communication profile of the first participant is stored on a remote server and each communication profile of the first participant is obtainable from the remote server.

7. A method as recited in claim 1, wherein automatically discovering includes obtaining an association between the first communication device and an IP (Internet Protocol) telephone that is coupled to the first communication device whereby such association indicates that the IP telephone is proximate and available for such first participant.

8. A method as recited in claim 1, wherein automatically discovering includes, in a wireless communication, exchanging wireless information, which is included within the communication profile of the first participant, between the first communication device and one or more other communication devices that are proximate to the first communication device.

9. A method as recited in claim 8, wherein exchanging wireless information is accomplished using a Bluetooth protocol.

10. A method as recited in claim 8, wherein exchanging wireless information is accomplished using radio frequency (RF) signals.

11. A method as recited in claim 8, wherein exchanging wireless information is accomplished using infrared (IR) signals.

12. A method as recited in claim 1, wherein automatically discovering includes detecting that one or more proximate communication devices share a same wireless access point as the first communication device.

13. A method as recited in claim 1, further comprising repeating operations (a) through (c) for each participant, wherein escalating from the first communication device being used for the IM session to the optimum communication device being used for the audio or audiovisual session between the participants is accomplished by a call manager that initiates the audio or audiovisual session between the selected optimum communication devices of the participants.

14. A method as recited in claim 1, wherein steps (a) and (b) are only performed after a request for an audio or audiovisual session is received from a selected one of the participants.

15. A computer system for escalating an instant message (IM) session to an audio or audiovisual session, comprising:
one or more processors;
one or more memory, wherein at least one of the processors and memory are configured for:
(a) automatically discovering for a first participant of an IM session on a first communication device what other communication devices are proximate to the first communication device, wherein the one or more proximate other communication devices differ from the first communication device of the first participant, wherein the first communication device and other communication devices pertain to different physical devices;
(b) from the one or more proximate other communication devices that were automatically discovered to be proximate to the first communication device, selecting an optimum communication device for use by the first participant in an audio or audiovisual session; and
(c) in response to a request for escalating the IM session to an audio or audiovisual session being received from a selected one of the participants of the IM session, escalating from the first communication device being used for the IM session by the first participant to the selected optimum communication device being used for the audio or audiovisual session by the first participant.

16. A computer system as recited in claim 15, wherein selecting an optimized communication device for the first participant includes considering audio quality of each proximate other communication device for the first participant, proximity of each proximate other communication device to the first participant, bandwidth size that is available for the audio or audiovisual session, and/or associated toll of using each proximate other communication device for each participant.

17. A computer system as recited in claim 15, wherein automatically discovering what other communication devices are proximate to the first communication device includes obtaining a communication profile for the first participant that specifies a plurality of different phone numbers of the first participant's different communication devices and an indication of priority for using such different communication devices for the first participant.

18. A computer system as recited in claim 17, wherein the first communication device that is being used by the first participant for the IM session is configured with the first participant's communication profile and also receives a communication profile from the other participants via their remote computer devices so that the communication profile of the first participant is obtained from the first communication device and the communication profile of the other participants are obtained by being received into the first communication device from their remote computer devices.

19. A computer system as recited in claim 17, wherein the communication profile of the first participant is created or modified by such first participant.

20. A computer system as recited in claim 17, wherein the communication profile of the first participant is stored on a remote server and each communication profile of the first participant is obtainable from the remote server.

21. A computer system as recited in claim 15, wherein automatically discovering includes obtaining an association between the first communication device and an IP (Internet Protocol) telephone that is coupled to the first communication device whereby such association indicates that the IP telephone is proximate and available for such first participant.

22. A computer system as recited in claim 15, wherein automatically discovering includes, in a wireless communication, exchanging wireless information, which is included within the communication profile of the first participant, between the first communication device and one or more other communication devices that are proximate to the first communication device.

23. A computer system as recited in claim 22, wherein exchanging wireless information is accomplished using a Bluetooth protocol.

24. A computer system as recited in claim 22, wherein exchanging wireless information is accomplished using radio frequency (RF) signals.

25. A computer system as recited in claim 22, wherein exchanging wireless information is accomplished using infrared (IR) signals.

26. A computer system as recited in claim 15, wherein detecting includes automatically discovering that one or more proximate communication devices share a same wireless access point as the first communication device.

27. A computer system as recited in claim 15, wherein at least one of the processors and memory are further configured for repeating operations (a) through (c) for each participant, wherein escalating from the first communication device being used for the IM session to the optimum communication device being used for the audio or audiovisual session between the participants is accomplished by a call manager that initiates the audio or audiovisual session between the selected optimum communication devices of the participants.

28. A computer system as recited in claim 15, wherein steps (a) and (b) are only performed after a request for an audio or audiovisual session is received from a selected one of the participants.

29. An apparatus for escalating an instant message (IM) session to an audio or audiovisual session, comprising:
 means for automatically discovering for a first participant of an IM session on a first communication device what other communication devices are proximate to the first communication device, wherein the one or more proximate other communication devices differ from the first communication device of the first participant, wherein the first communication device and other communication devices pertain to different physical devices;
 means for selecting an optimum communication device for use by the first participant in an audio or audiovisual session, wherein the optimum communication device is selected from the one or more proximate other communication devices that were automatically discovered to be proximate to the first communication device; and
 means for, in response to a request for escalating the IM session to an audio or audiovisual session being received from a selected one of the participants of the IM session, escalating from the first communication device being used for the IM session by the first participant to the selected optimum communication device being used for the audio or audiovisual session by the first participant.

* * * * *